US008643752B1

(12) United States Patent
McClatchie

(10) Patent No.: US 8,643,752 B1
(45) Date of Patent: *Feb. 4, 2014

(54) SYSTEM AND METHOD FOR REDUCING MOTION BLUR USING CCD CHARGE SHIFTING

(75) Inventor: Iain Richard Tyrone McClatchie, Los Altos, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/456,107

(22) Filed: Apr. 25, 2012

Related U.S. Application Data

(63) Continuation of application No. 12/344,341, filed on Dec. 26, 2008, now Pat. No. 8,169,519.

(60) Provisional application No. 61/006,128, filed on Dec. 26, 2007.

(51) Int. Cl.
*H04N 5/335* (2011.01)

(52) U.S. Cl.
USPC ........ 348/294; 348/241; 348/297; 348/208.6; 348/207.99

(58) Field of Classification Search
USPC ............................................ 348/207.99–376
See application file for complete search history.

(56) References Cited

U.S. PATENT DOCUMENTS

| | | | | |
|---|---|---|---|---|
| 5,572,256 A | * | 11/1996 | Egawa et al. | 348/296 |
| 5,675,623 A | * | 10/1997 | Shelby | 377/54 |
| 5,990,952 A | * | 11/1999 | Hamasaki | 348/311 |
| 6,670,986 B1 | * | 12/2003 | Shoshan et al. | 348/219.1 |
| 6,784,935 B1 | * | 8/2004 | Uya et al. | 348/311 |
| 6,930,724 B1 | * | 8/2005 | Tengeiji et al. | 348/367 |
| 2005/0248676 A1 | * | 11/2005 | Christenson | 348/317 |
| 2006/0023099 A1 | * | 2/2006 | Vitsnudel et al. | 348/312 |
| 2006/0098107 A1 | * | 5/2006 | Lee et al. | 348/241 |
| 2006/0209204 A1 | * | 9/2006 | Ward | 348/362 |
| 2007/0075218 A1 | * | 4/2007 | Gates et al. | 250/208.1 |
| 2010/0157126 A1 | * | 6/2010 | Compton et al. | 348/311 |

FOREIGN PATENT DOCUMENTS

WO    WO 9712483 A1 * 4/1997    ............ H04N 5/225

* cited by examiner

*Primary Examiner* — Nicholas Giles
*Assistant Examiner* — Abdelaaziz Tissire
(74) *Attorney, Agent, or Firm* — Sterne, Kessler, Goldstein & Fox P.L.L.C.

(57) ABSTRACT

A method and system is disclosed for reducing motion blur using CCD charge shifting. In one embodiment, photodiode wells are exposed for a set of successive exposures with each exposure duration being a fraction of a total exposure time. After each successive exposure, the photodiode wells integrate signal charges and shift them to corresponding storage lines. The shifted signal charges are then shifted along the storage lines for a specified number of storage units. At the same time, the CCD is moved in the direction of a leading edge of the CCD. The photodiode wells are then exposed for another exposure to produce another set of signal charges, which are shifted to the storage lines. Signal charges from the successive exposures are accumulated at the storage lines. After all successive exposures have been taken, the accumulated signal charges are shifted to a serial shift register and output to form an image.

20 Claims, 9 Drawing Sheets

200

900

SYSTEM AND METHOD FOR REDUCING MOTION BLUR USING CCD CHARGE SHIFTING

CROSS REFERENCE TO RELATED APPLICATIONS

This application is a continuation of U.S. patent application Ser. No. 12/344,341, filed Dec. 26, 2008, which claims the benefit of U.S. Provisional Patent Application No. 61/006,128, filed on Dec. 26, 2007, entitled "System and Method for Reducing Motion Blur Using CCD Charge Shifting" by Iain Richard Tyrone McClatchie, which is incorporated herein by reference in its entirety.

FIELD OF THE INVENTION

The present invention relates to digital imaging using charge-coupled devices (CCDs), and in particular to reducing motion blur caused by CCD movement.

BACKGROUND OF THE INVENTION

When taking an image with a camera moving during a period of exposure, an object in the image that is not moving at the same rate as the camera may appear blurred or smeared along the direction of relative motion. This effect is often called motion blur. The longer the exposure time, more the imaged object moves with respect to the camera and the more the picture is blurred. One simple solution to avoid motion blur is fixing the camera position with respect to the objects to be captured in the image. There are also techniques such as image stabilization, vibration reduction, and anti-shake techniques to counteract the motion of a camera to reduce motion blur. However, such techniques only apply when the motion blur is caused by a slight motion of the camera, such as shaking, vibrating, etc. These techniques can not help in situations where the camera motion is significant.

Because motion blur is related to the image exposure time, reducing the exposure time can reduce the amount of motion blur. However, a shorter exposure time also results in a lower amount of light entering the camera sensor, which in turn, affects the quality of the picture. That is, a picture produced with a shorter exposure time appears to be darker than a picture produced with a longer exposure time.

With the introduction of digital cameras and advances of digital imaging, there are also efforts to reduce motion blur using software-based image processing techniques to process digitalized pictures (or digital images) after they are produced. However, because digital images alone do not provide information about the camera movement during exposures, results from software-based techniques are often not as good as solutions applied on the camera itself.

BRIEF SUMMARY OF THE INVENTION

A method and system is disclosed for reducing motion blur using charge-coupled device (CCD) charge shifting. In one embodiment, photodiode wells and storage lines on a CCD are reset for an exposure. The photodiode wells are then exposed for a first exposure duration as a fraction of a total exposure time. The photodiode wells integrate signal charges during the exposure and shift the signal charges to corresponding storage lines. The signal charges are shifted along the storage lines for a specified number of storage units. At the same time, the CCD is moved in the direction of a leading edge of the CCD for the same specified number of storage units. Then the photodiode wells are exposed for a second exposure duration as a fraction of a total exposure time. The photodiode wells integrate a second set of signal charges and shift the second set of signal charges to the corresponding storage lines. The shifted second set of signal charges are accumulated with the existing signal charges at the storage lines. An additional number of successive exposures can be produced following the above procedure if necessary. Then the accumulated signal charges from all the successive exposures are shifted to a serial shift register and output from the serial shift register to form an image.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawings in which an element first appears is generally indicated by the left-most digit in the corresponding reference number.

DETAILED DESCRIPTION OF THE INVENTION

The present invention relates to reducing motion blur in digital imaging caused by movements of a charge-coupled device (CCD). In the detailed description of the invention herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
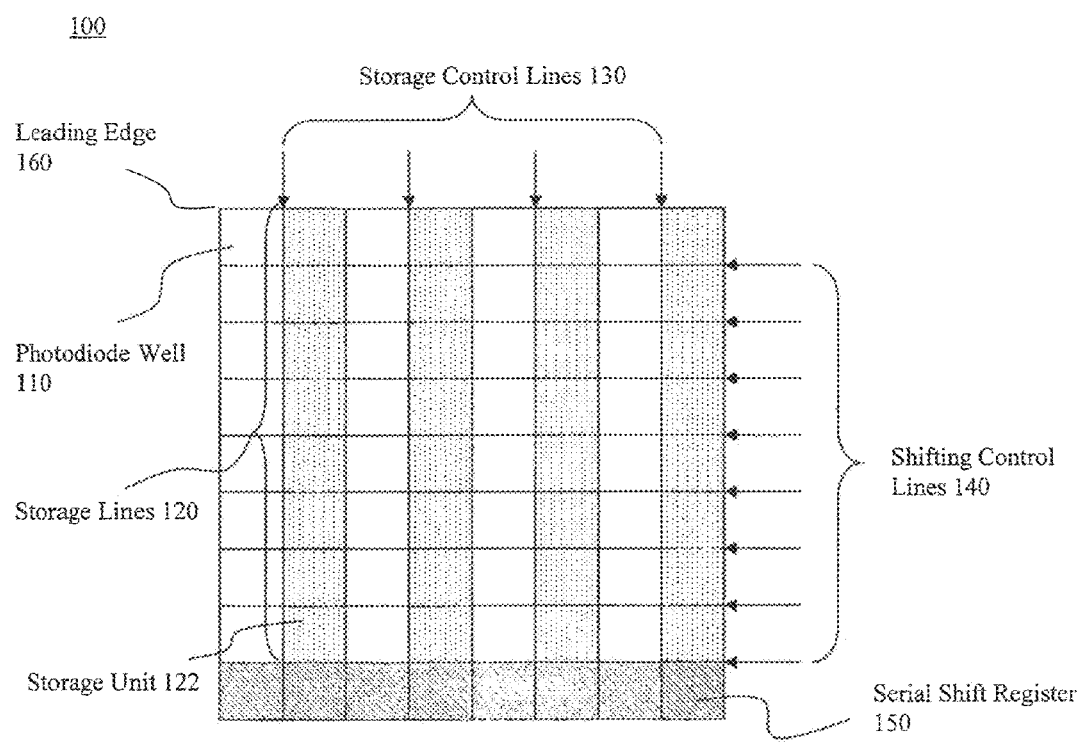
FIG. 1 is an illustrative diagram of the structure of a charge-coupled device (CCD) according to one embodiment of the invention.

A CCD-based digital camera uses a CCD image sensor to sense the light intensities to which it is exposed in order to produce digital images. FIG. 1 shows an illustrative diagram of several key components of a CCD 100 according to one embodiment of the invention. CCD 100 includes a collection of photodiode wells 110, a set of storage lines 120, storage control lines 130, shifting control lines 140, and an array of serial shift registers 150. Photodiode wells correspond to pixels in an image produced by a digital camera using CCD 100 as an image sensor. In one embodiment, each photodiode well 110 corresponds to one pixel in an image. In one embodiment, photodiode wells 110 are exposed to light for a duration of time (or exposure time). During the exposure, each photodiode well 110 collects (or integrates) a signal charge proportional to a light intensity at its location. The set of storage lines 120 store signal charges integrated at photodiode wells. Each storage line 120 includes a set of storage units. Each storage unit corresponds to a neighboring photodiode well 110. After the signal charges are integrated at photodiode wells 110, storage control lines 130 control the shifting of the integrated signal charges from each of the photodiode wells to corresponding neighboring storage unit in storage lines 120. Therefore, each storage unit in the storage lines can store signal charges corresponding to a pixel. Then, shifting control lines 140 control the shifting of the signal charges from storage lines 120 to serial shift register 150. The shifted signal charges at serial shift register 150 can be output to produce a digital image.

In one embodiment of the invention, because of the charge-shifting feature of a CCD, motion blur caused by movement of a CCD-based digital camera can be reduced by integrating and shifting signal charges from successive exposures. For example, a total exposure time required to produce an image can be divided into a set of successive exposure durations. In this manner, a set of successive exposures are produced within the total exposure time instead of having just one exposure during the total exposure time. Each of the successive exposures has a corresponding exposure duration in the set of successive exposure durations. For example, if a total exposure time is T seconds and two successive exposures are desired, each successive exposure duration in the set of successive exposure durations may be one-half of T seconds.

Signal charges for each successive exposure may be integrated and shifted while moving the CCD along a direction of the CCD at a specified speed. In one embodiment, the direction of the CCD is the direction of a leading edge of the CCD. A leading edge of the CCD, such as leading edge 160 in FIG. 1, is the edge of the CCD oriented towards the direction of motion of the CCD. In other embodiments, the CCD may be moved along a direction depending upon particular applications. The signal charges from successive exposures are accumulated in the storage lines and shifted to the serial shift register for output. The successive exposure durations may be set to match the rate at which the CCD moves. By shifting the signal charges along the storage lines in a direction corresponding to the CCD moving direction, the signal charges from each successive exposure may correspond to the same scene being captured by the CCD. Because each successive exposure duration is shorter than the total exposure time, the corresponding successive exposure will produce signal charges with less motion blur. The accumulation of the successive signal charges acts to enhance the light intensity for each pixel and improve the quality of the produced final image.

Figure 2:
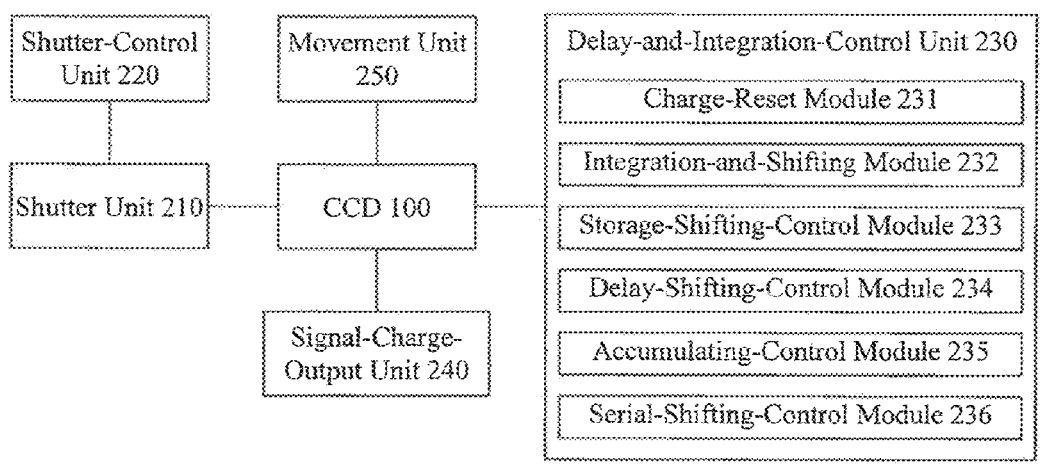
FIG. 2 is an illustrative diagram of the structure of a system for reducing motion blur using CCD charge shifting according to one embodiment of the invention.

FIG. 2 shows an illustrative structure of the system for reducing motion blur using CCD charge shifting according to one embodiment of the invention. System 200 includes a CCD 100 as an image sensor, a shutter unit 210 that controls the system to be exposed to light, a shutter-control unit 220 that controls the operation of the shutter unit, a delay-and-integration-control unit 230 that controls the delay, integration, and shifting of signal charges of the CCD, a signal-charge-output unit 240 that controls the signal charges to be output to produce an image, and a movement unit 250 that controls the movement of the CCD.

Delay-and-integration-control unit 230 includes a charge-reset module 231, an integration-and-shifting module 232, a storage-shifting-control module 233, a delay-shifting-control module 234, an accumulating-control module 235, and a serial-shifting-control module 236. Charge-reset module 231 controls resetting photodiode wells 110 and storage lines 120 for an exposure. Integration-and-shifting module 232 controls integrating signal charges at photodiode wells 110 during an exposure and shifting the integrated signal charges to storage lines 120. Storage-shifting-control module 233 controls shifting signal charges along storage lines 120. Delay-shifting-control module 234 controls delaying the shifting of signal charges from storage lines 120 to serial shift register 150 for a pre-defined duration. Accumulating-control module 235 controls accumulating the signal charges shifted from photodiode wells 110 with existing signal charges at storage lines 120. Serial-shifting-control module 236 controls shifting signal charges from storage lines 120 to serial shift register 150.

In a CCD-based camera mounted on a moving vehicle and used to take street view pictures, motion blur may occur because of the camera movement. In general, when taking a picture, a shorter exposure time may reduce the motion blur caused by the camera movement. However, this also causes the photodiode wells of the CCD to receive a lower amount of light compared with a longer exposure. This produces low quality images (e.g., dark images). According to one embodiment of the invention, accumulating signal charges from successive, short-duration exposures enhances the signal charges for most pixels in the produced image and improves the image quality.

Figure 7:
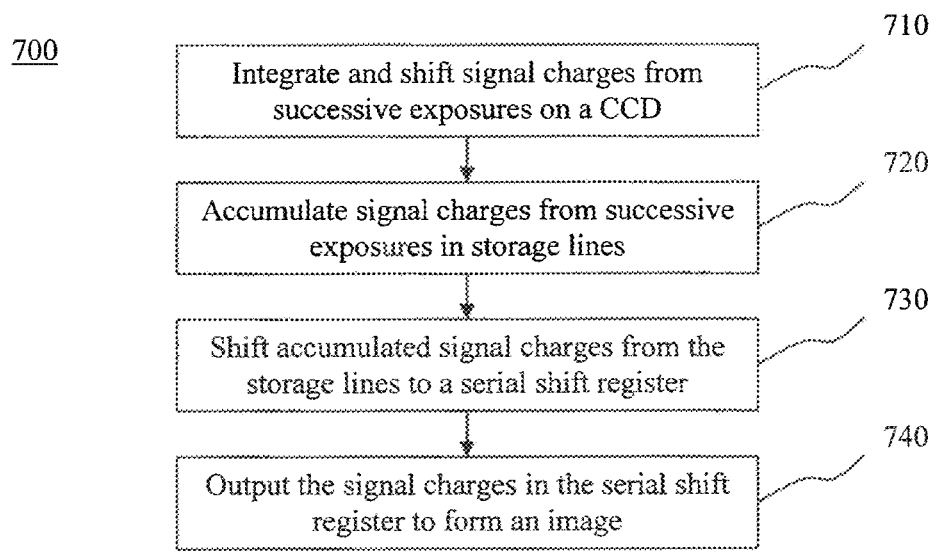
FIG. 7 is a flowchart of an exemplary routine for reducing motion blur using CCD shifting according to one embodiment of the invention.

FIG. 7 is a flowchart of an exemplary routine 700 for reducing motion blur by CCD charge shifting when producing an image according to one embodiment of the invention. Although routine 700 will be described with reference to CCD 100 and system 200, one of skill in the art will recognize that routine 700 may be used with any type of CCD or control system without departing from the spirit and scope of the present invention.

In step 710, signal charges from a plurality of successive exposures are integrated and shifted on a CCD. In one embodiment of the invention, a total exposure time for producing an image is divided into a set of durations for successive exposures. That is, signal charges from a first exposure are integrated and shifted from photodiode wells, such as photodiode wells 110, to storage lines, such as storage lines 120. Before storage lines 120 are reset, photodiode wells 110 are exposed with a second exposure. Signal charges from the second exposure are then integrated and shifted from photodiode wells 110 to storage lines 120.

In step 720, the signal charges from successive exposures are accumulated in the storage lines. For example, the signal charges may be combined or further integrated in storage lines 120.

In step 730, the accumulated signal charges are shifted from the storage lines, such as storage lines 120, to the serial shift register, such as serial shift register 150.

In step 740, the signal charges in the serial shift register, such as serial shift register 150, are output to form an image.

Figure 8:
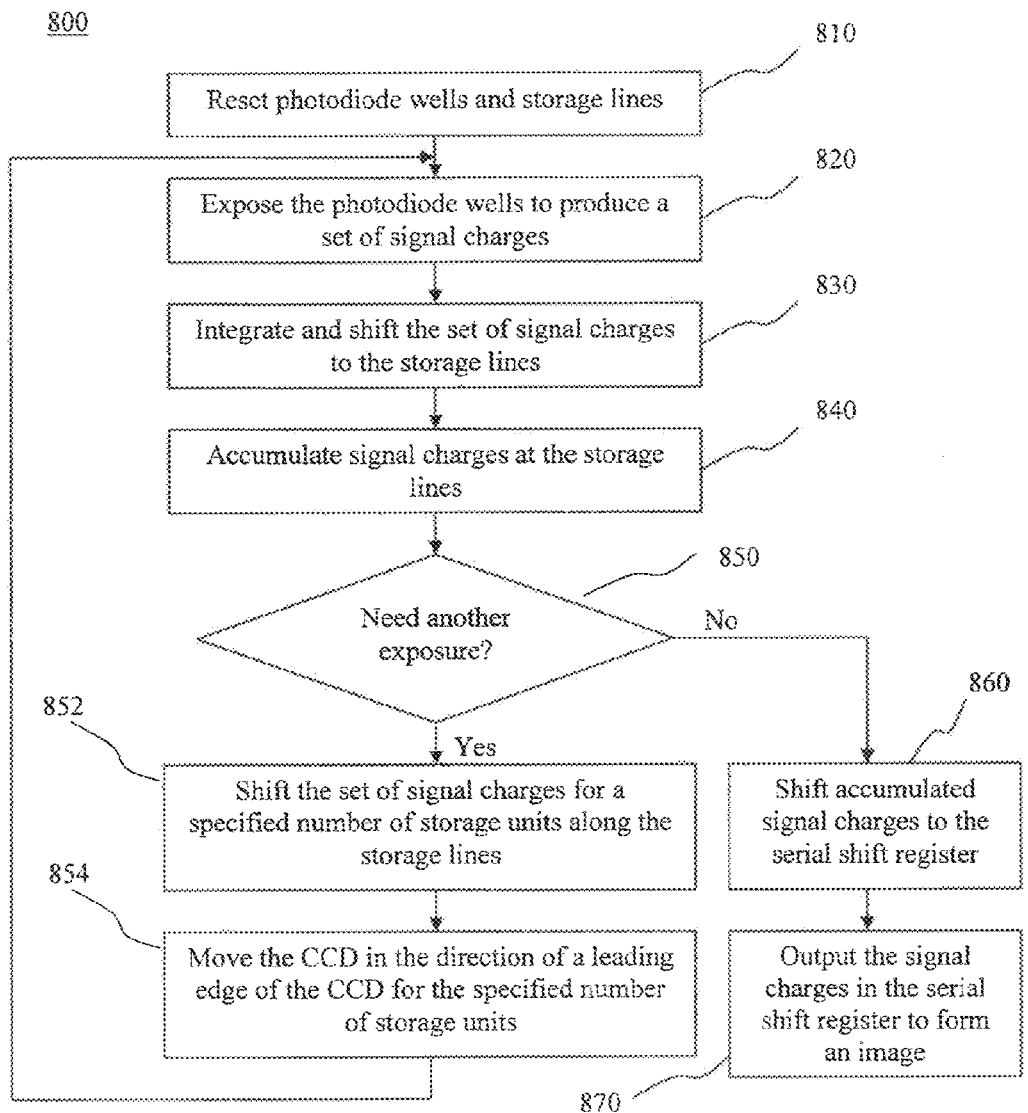
FIG. 8 is a flowchart of an exemplary routine for integrating and shifting signal charges in the CCD to reduce motion blur according to one embodiment of the invention.

FIG. 8 is a flowchart of an exemplary routine 800 illustrating more details about exemplary routine 700. FIG. 8 will be further described with reference to FIGS. 1 and 3-6. FIGS. 3-6 show illustrative diagrams of the integration, accumulation, and shifting of signal charges inside the CCD according to one embodiment of the invention. One of skill in the art will recognize that the routine of FIG. 8 may apply to other CCDs and systems without departing from the spirit and scope of the present invention.

In step 810, photodiode wells 110 and storage lines 120 of CCD 100 are reset to clear any existing signal charges.

In step 820, photodiode wells 110 are exposed to light. The amount of light received by photodiode wells 110 is controlled by shutter unit 210. Shutter unit 210 is in turn controlled by shutter-control unit 220. Exposure time (or duration of an exposure) may be controlled by shutter unit 210 or shutter-control unit 220 also control the exposure time.

Figure 3:
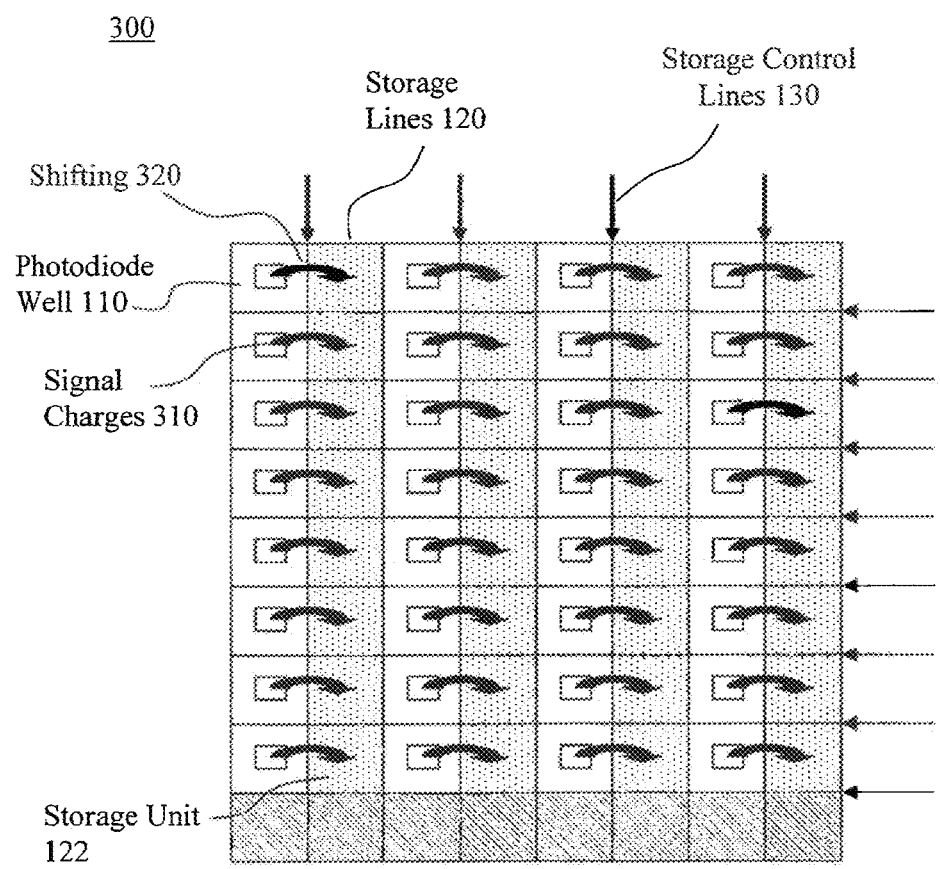
FIG. 3 is an illustrative diagram of the procedure of shifting signal charges from photodiode wells to storage lines in the CCD according to one embodiment of the invention.

In step 830, photodiode wells 110 integrate a set of signal charges due to the exposure. The integrated signal charges are then shifted to storage lines 120. For example, as illustrated in FIG. 3, after photodiode wells 110 collect and integrate signal charges 310 for an exposure, integration-and-shifting module 232 toggles storage control lines 130. This triggers the process of shifting 320 of integrated signal charges 310 from photodiode wells 110 to corresponding storage lines 120.

In step 840, when signal charges 310 are shifted to storage lines 120, signal charges 310 accumulate with existing signal charges in storage lines 120. If signals charges 310 correspond to a first exposure, there are no existing signal charges in storage lines 120 and the accumulation only includes the shifted signal charges from photodiode wells 110.

After the signal charges have been accumulated in the storage lines, routine 800 proceeds to step 850. In step 850, system 200 tests whether another exposure is needed. In one embodiment, system 200 can set a total number of successive exposures to produce an image. System 200 may compare the number of produced successive exposures for the image to be produced with the total number of successive exposures. If the number of produced successive exposures is smaller than the total number, another exposure is needed. Routine 800 proceeds to step 852.

Figure 4:
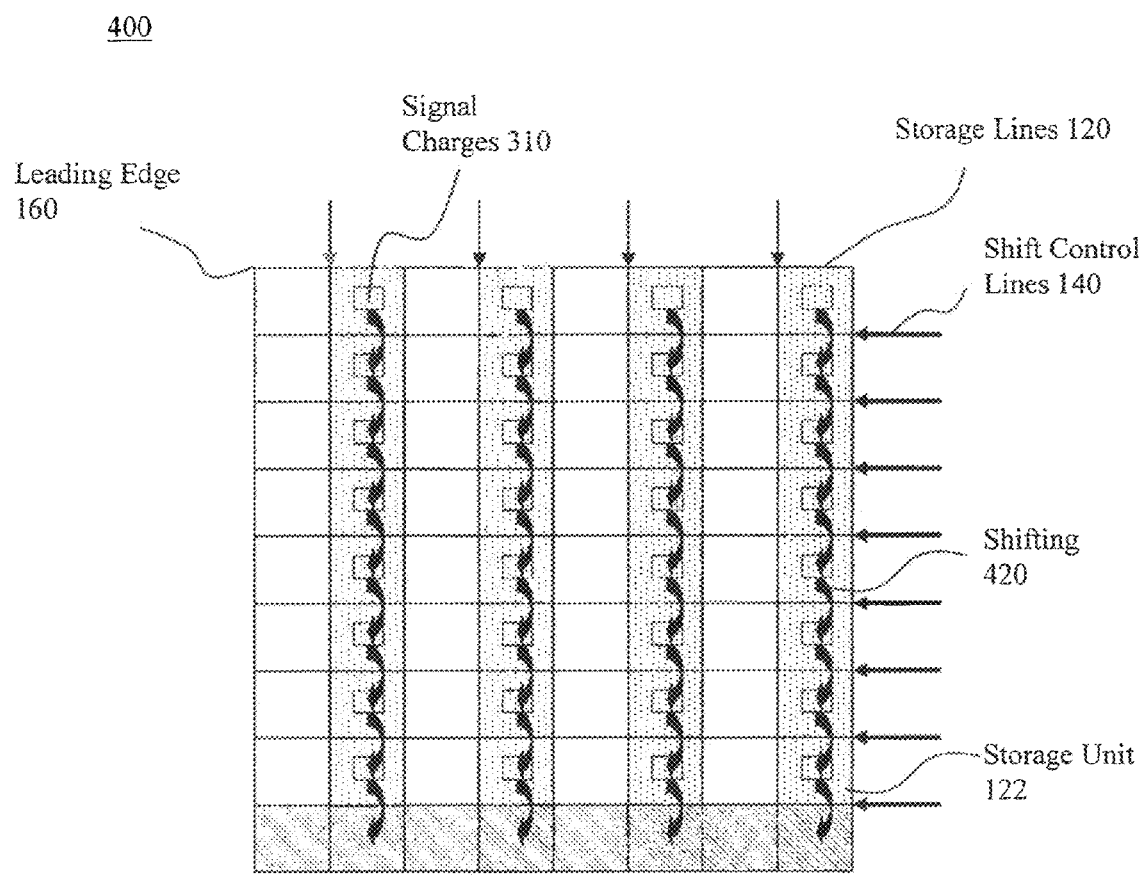
FIG. 4 is an illustrative diagram of the procedure of shifting the signal charges along the storage lines in the CCD according to one embodiment of the invention.

In step 852, the accumulated signal charges are shifted along storage lines 120 for a specified number of storage units. As mentioned above, each storage unit may correspond to a pixel in the produced image. For example, as illustrated in FIG. 4, storage-shifting-control module 233 toggles shift control lines 140. This triggers the shifting 420 of signal charges 310 along storage lines 120 for a specified number of storage units.

The specified number of storage units for the shifting of signal charges along storage lines 120 is determined by several factors, including the type of the CCD (e.g. Bayer mosaic CCD or panchromatic CCD, etc.), the speed of the CCD movement, the number of successive exposures, and image quality desired by a user, etc. Different types of CCDs include, for example and without limitation, Bayer mosaic CCDs, RGBE CCDs, and panchromatic CCDs.

Figure 9:
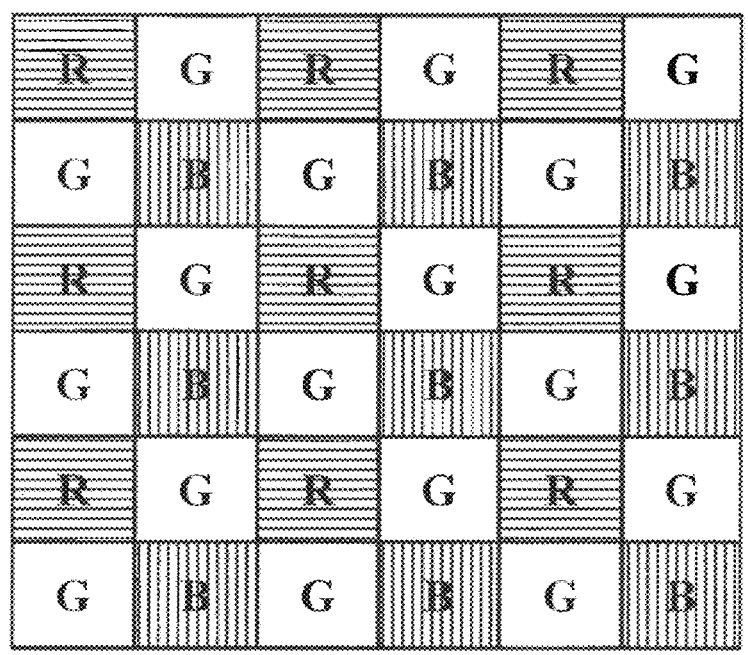
FIG. 9 is an illustrative diagram of a color scheme of a Bayer mosaic CCD.

One type of CCD used in many digital cameras is a Bayer mosaic CCD. A Bayer mosaic CCD uses a Bayer filter over the CCD that allows the photodiode wells to integrate signal charges for individual RGB colors (i.e. red, green, and blue). FIG. 9 shows an illustrative diagram of the RGB color distribution of a Bayer mosaic CCD. In FIG. 9, R represents red, G represents green, and B represents blue. The RGB color arrangement over the CCD may produce as many as green pixels as red and blue combined to mimic the human eye's greater resolving power with green light.

In a Bayer mosaic CCD, every other photodiode well in an orthogonal direction of the CCD has a same color arrangement. Therefore, if a Bayer mosaic CCD is used in one embodiment, the specified number of storage units for the shifting of the signal charges along the storage lines and the CCD movement will be a multiple of two.

A RGBE CCD is similar to a Bayer mosaic CCD with a different color filter (i.e. RGBE filter) over the CCD. The RGBE filter has a color distribution of red, green, blue and emerald (similar to the color cyan).

Another type of CCD is a panchromatic CCD. A panchromatic CCD uses photodiode wells that are all sensitive to the same wavelength(s) of light and collect a larger amount of light when exposed. Because each photodiode well captures the same wavelength(s), a panchromatic CCD does not need a color arrangement such as the RGB color distribution in the Bayer mosaic CCD. Thus, if a panchromatic CCD is used in system 800, the specified number of storage units for the shifting of the signal charges along the storage lines and the CCD movement can be any natural number depending on image quality requirements.

Returning to routine 800 in FIG. 8, in step 854 CCD 100 is moved in a direction toward leading edge 160 of CCD 100 for the same number of storage units as were shifted during step 852. This ensures that signal charges to be received by the storage units are accumulated with previous signal charges from the same image. At the same time, delay-shifting-control module 234 delays the shifting of signal charges from storage lines 120 to serial shift register 150.

After CCD 100 is moved in step 852, routine 800 returns to step 820, where photodiode wells 110 are exposed for a successive exposure to integrate corresponding signal charges.

Figure 5:
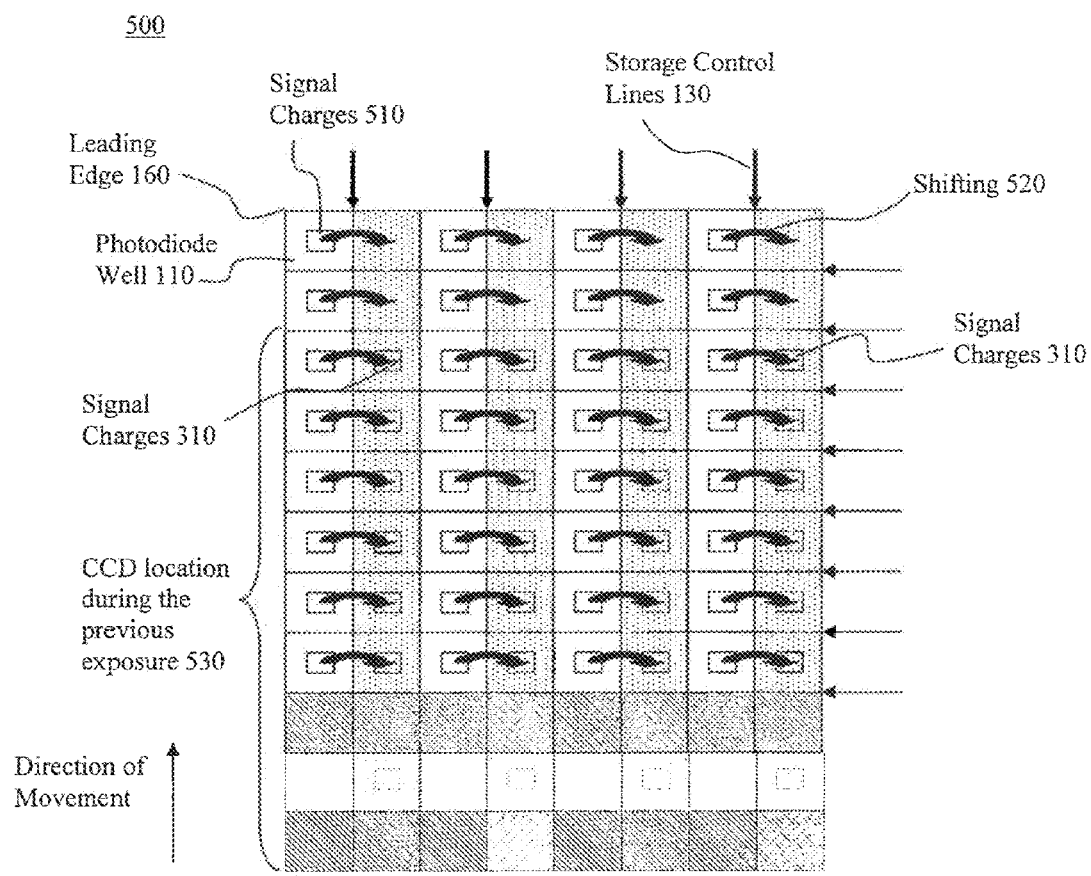
FIG. 5 is an illustrative diagram of the procedure of shifting the signal charges of a successive exposure from the photodiode wells to the storage lines in the CCD according to one embodiment of the invention.

When routine 800 returns to step 840, signal charges already exist in storage lines 120 as a result of the first pass through steps 820 through 854. For example, as illustrated in FIG. 5, after the integration of the signal charges 510 from the successive exposure, storage control lines 130 are toggled again by integration-and-shifting module 232. This triggers the shifting 520 of integrated signal charges 510 of the successive exposure from photodiode wells 110 to corresponding storage lines 120. Because signal charges 310 are still present in storage lines 120, accumulating-control module 235 controls storage lines 120 to combine signal charges 510 shifted from photodiode wells 110 after the successive exposure with signal charges 310 in storage lines 120.

FIG. 5 also illustrates the CCD movement between exposures. In this exemplary embodiment, signal charges 310 from the previous exposure are shifted along storage lines 120 for two storage units. At the same time, CCD 100 is moved in the direction of leading edge 160 for two storage units. Because the signal charges from the previous exposure are shifted along the storage lines for, in this example, two storage units, the top two rows of storage units in the storage lines do not have signal charges when the signal charges of the current exposure are shifted from photodiode wells 110 to storage lines 120 during shifting 520. In addition, because CCD 100 is moved in the direction of leading edge 160, which is the opposite direction from the direction of shifting 520 occurring along storage lines 120 in this exemplary embodiment, the signal charges integrated in photodiode wells 110 for the successive exposure correspond to the same storage units of the signal charges remaining in storage lines 120 from the previous exposure.

Figure 6:
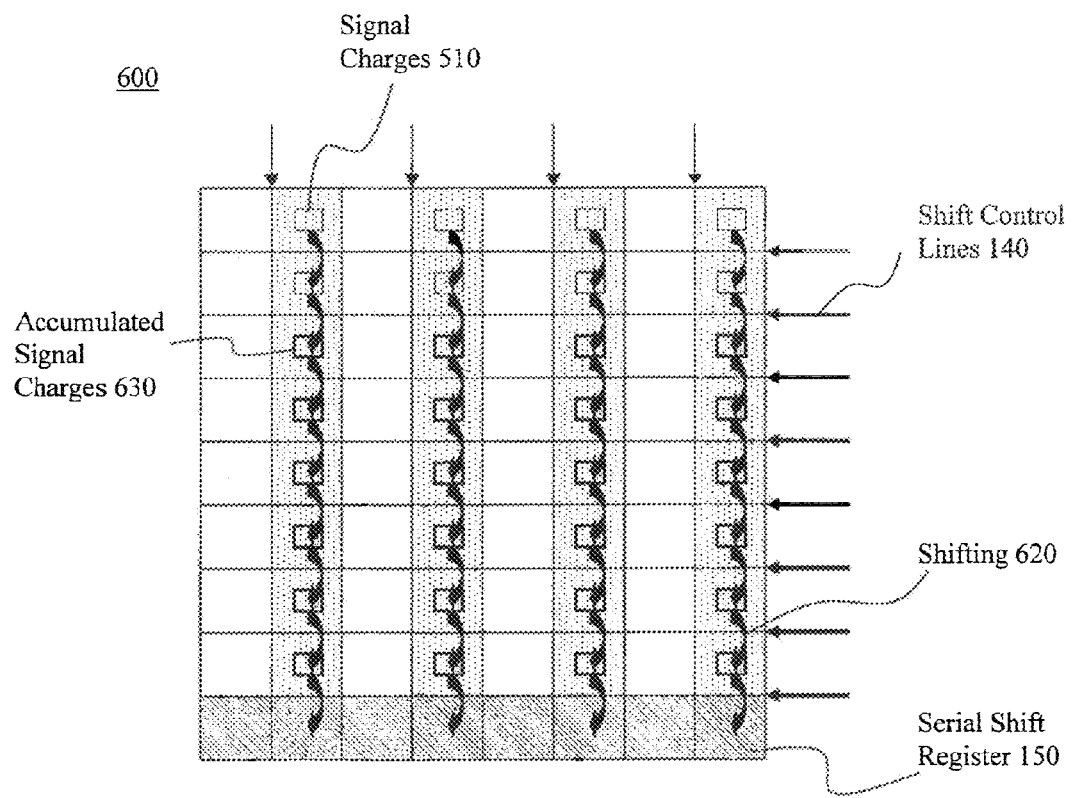
FIG. 6 is an illustrative diagram of the procedure of shifting the accumulated signal charges from the storage lines to a serial shift register of the CCD according to one embodiment of the invention.

In step 850 of routine 800, if it is determined that no further exposures are needed, routine 800 proceeds to step 860. In step 860, accumulated signal charges are shifted to a serial shift register. For example, as illustrated in FIG. 6, serial-shifting-control module 236 toggles shift control lines 140. This triggers the shifting 620 of the shifted signal charges 510 and accumulated signal charges 630 to serial shift register 150.

In step 860 of routine 800, accumulated signal charges in the serial shift register are output to form an image. For example, accumulated signal charges 610 in serial shift register 150 are output by signal-charge-output unit 240 to form an image.

In this manner, multiple short-exposure-time signals are combined to create a single image with reduced motion blur.

The systems and methods of the present invention can be applied to any CCD-based camera, including a Bayer mosaic CCD camera a panchromatic CCD camera, etc. The present invention is not limited to reducing motion blur caused by camera movement. By moving the CCD in the direction of movement of an object for a number of storage units related to the speed of the object, motion blur caused by the movement of the object can also be reduced.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of reducing motion blur in a digital image produced by a moving charge-coupled device (CCD), comprising:

integrating signal charges at photodiode wells from successive exposures on the CCD, each photodiode well corresponding to a pixel of the digital image, by exposing the CCD to a subject, wherein the duration of each successive exposure is chosen to be a fraction of a total exposure duration that is proportional to a speed at which the CCD physically moves;

shifting the signal charges for each successive exposure in a direction opposite to a direction of CCD motion as the CCD physically moves, wherein a distance of the shift is proportional to a speed at which the CCD physically moves;

accumulating the signal charges from the successive exposures in storage lines of the CCD to enhance the light intensity of each pixel, wherein the integrating and shifting cause the signal charges to be accumulated with other signal charges that correspond to a same portion of the subject;

shifting the accumulated signal charges from the storage lines to a serial shift register; and outputting the accumulated signal charges from the serial shift register to produce a digital image.

2. The method of claim 1, wherein the CCD is a Bayer mosaic CCD, and shifting the signal charges comprises shifting the signal charges by two storage units along the storage lines.

3. The method of claim 1, wherein the CCD is a panchromatic CCD, and shifting the signal charges comprises shifting the signal charges by one storage unit along the storage lines.

4. The method of claim 1, wherein a distance of the shift is proportional to a speed at which the CCD physically moves and is determined based on at least one of: a type of the CCD, a number of successive exposures, and an image quality desired by a user.

5. The method of claim 1, wherein the CCD is an RGBE CCD.

6. The method of claim 1, wherein accumulating the signal charges comprises holding shifting control lines of the CCD for a specified time.

7. The method of claim 1, wherein shifting the accumulated signal charges from the storage lines to a serial shift register comprises toggling shifting control lines of the CCD.

8. A system for reducing motion blur in a digital image produced by a moving charge-coupled device (CCD), comprising:

a CCD comprising photodiode wells, storage lines, storage control lines, shifting control lines, and a serial shift register;

a shutter-control unit configured to expose the CCD to a subject, wherein the duration of each successive exposure is chosen to be a fraction of a total exposure duration that is proportional to a speed at which the CCD physically moves;

a delay-and-integration control unit configured to:

integrate signal charges at the photodiode wells from the successive exposures on the CCD, each photodiode well corresponding to a pixel of the digital image;

shift the signal charges for each successive exposure in a direction opposite to a direction of CCD motion as the CCD physically moves, wherein a distance of the shift is proportional to a speed at which the CCD physically moves;

accumulate the signal charges from the successive exposures in the storage lines of the CCD to enhance the light intensity of each pixel, wherein the integrating and shifting cause the signal charges to be accumulated with other signal charges that correspond to a same portion of the subject; and shift the accumulated signal charges from the storage lines to the serial shift register; and a signal-charge-output unit configured to output the accumulated signal charges from the serial shift register to produce a digital image.

9. The system of claim 8, wherein the CCD is a Bayer mosaic CCD, and the delay-and-integration-control unit is configured to shift the signal charges by two storage units along the storage lines.

10. The system of claim 8, wherein the CCD is a panchromatic CCD, and the delay-and-integration-control unit is configured to shift the signal charges by one storage unit along the storage lines.

11. The system of claim 8, wherein a distance of the shift is proportional to a speed at which the CCD physically moves and is determined based on at least one of: a type of the CCD, a number of successive exposures, and an image quality desired by a user.

12. The system of claim 8, wherein the CCD is an RGBE CCD.

13. The system of claim 8, wherein the delay-and-integration-control unit is configured to accumulate the signal charges by holding shifting control lines of the CCD for a specified time.

14. The system of claim 8, wherein the delay-and-integration-control unit is configured to shift the accumulated signal charges from the storage lines to a serial shift register by toggling shifting control lines of the CCD.

15. A non-transitory computer readable storage medium having instructions stored thereon that, when executed by a processor, cause the processor to perform a method for reducing motion blur in a digital image produced by a moving charge-coupled device (CCD), the method comprising:

integrating signal charges at photodiode wells from successive exposures on the CCD, each photodiode well corresponding to a pixel of the digital image, by exposing the CCD to a subject, wherein the duration of each successive exposure is chosen to be a fraction of a total exposure duration that is proportional to a speed at which the CCD physically moves;

shifting the signal charges for each successive exposure in a direction opposite to a direction of CCD motion as the CCD physically moves, wherein a distance of the shift is proportional to a speed at which the CCD physically moves;

accumulating the signal charges from the successive exposures in storage lines of the CCD to enhance the light intensity of each pixel, wherein the integrating and shifting cause the signal charges to be accumulated with other signal charges that correspond to a same portion of the subject;

shifting the accumulated signal charges from the storage lines to a serial shift register; and outputting the accumulated signal charges from the serial shift register to produce a digital image.

16. The non-transitory computer readable storage medium of claim 15, wherein the CCD is a Bayer mosaic CCD, and shifting the signal charges comprises shifting the signal charges by two storage units along the storage lines.

17. The non-transitory computer readable storage medium of claim 15, wherein the CCD is a panchromatic CCD, and shifting the signal charges comprises shifting the signal charges by one storage unit along the storage lines.

18. The non-transitory computer readable storage medium of claim 15, wherein a distance of the shift is proportional to a speed at which the CCD physically moves and is determined based on at least one of: a type of the CCD, a number of successive exposures, and an image quality desired by a user.

19. The non-transitory computer readable storage medium of claim 15, wherein accumulating the signal charges comprises holding shifting control lines of the CCD for a specified time.

20. The non-transitory computer readable storage medium of claim 15, wherein shifting the accumulated signal charges from the storage lines to a serial shift register comprises toggling shifting control lines of the CCD.

* * * * *